United States Patent
Morimoto et al.

(10) Patent No.: US 6,488,609 B1
(45) Date of Patent: Dec. 3, 2002

(54) MOTOR CONTROL APPARATUS COMBINED TO ENGINE

(75) Inventors: Kazuhiko Morimoto; Yoshiaki Omata, both of Shizuoka-ken (JP)

(73) Assignee: Suzuki Motor Corporation, Hamamatsu (JP)

(*) Notice: Subject to any disclaimer, the term of this patent is extended or adjusted under 35 U.S.C. 154(b) by 41 days.

(21) Appl. No.: 09/672,631

(22) Filed: Sep. 28, 2000

(30) Foreign Application Priority Data

Sep. 30, 1999 (JP) .......................................... 11-278283

(51) Int. Cl.⁷ .............................................. B60K 41/02
(52) U.S. Cl. ........................................... 477/5; 477/181
(58) Field of Search ................................ 477/3, 5, 179, 477/181; 180/65.1, 65.2, 65.3, 65.4; 192/300

(56) References Cited

U.S. PATENT DOCUMENTS

| | | | | |
|---|---|---|---|---|
| 4,414,937 A | * | 11/1983 | Ueda et al. ............... | 123/198 D |
| 5,251,733 A | * | 10/1993 | Falck et al. ............ | 192/3.58 X |
| 5,337,848 A | * | 8/1994 | Bader ........................ | 477/5 X |
| 5,343,970 A | | 9/1994 | Severinsky | |
| 5,495,906 A | | 3/1996 | Furutani | |
| 5,698,905 A | | 12/1997 | Rüthlein et al. | |
| 5,762,156 A | | 6/1998 | Bates et al. | |
| 5,839,533 A | | 11/1998 | Mikami et al. | |
| 5,841,201 A | | 11/1998 | Tabata et al. | |
| 5,895,333 A | | 4/1999 | Morisawa et al. | |
| 5,927,415 A | | 7/1999 | Ibaraki et al. | |
| 5,935,040 A | | 8/1999 | Tabata et al. | |
| 5,957,806 A | * | 9/1999 | Hirose et al. ................. | 477/79 |
| 5,993,351 A | * | 11/1999 | Deguchi et al. ............... | 477/5 |
| 6,053,842 A | * | 4/2000 | Kitada et al. .................. | 477/5 |
| 6,083,139 A | * | 7/2000 | Deguchi et al. ............... | 477/5 |
| 6,110,066 A | | 8/2000 | Nedungadi et al. | |
| 6,116,364 A | | 9/2000 | Taguchi et al. | |
| 6,155,964 A | * | 12/2000 | Itoyama et al. ................ | 477/5 |
| 6,176,807 B1 | * | 1/2001 | Oba et al. ...................... | 477/5 |
| 6,208,036 B1 | * | 3/2001 | Evans et al. ............ | 180/65.2 X |
| 6,209,672 B1 | * | 4/2001 | Severinsky ................ | 180/65.2 |
| 6,234,932 B1 | | 5/2001 | Kuroda et al. | |
| 6,334,079 B1 | * | 12/2001 | Matsubara et al. ..... | 180/65.2 X |

FOREIGN PATENT DOCUMENTS

| | | |
|---|---|---|
| JP | 5-39750 | 2/1993 |
| JP | 5-322032 | 12/1993 |
| JP | 9-74602 | 3/1997 |

* cited by examiner

*Primary Examiner*—Charles A Marmor
*Assistant Examiner*—Roger Pang
(74) *Attorney, Agent, or Firm*—Flynn, Thiel, Boutell & Tanis, P.C.

(57) ABSTRACT

A motor control apparatus for a motor combined with an engine for a vehicle includes clutch switches operated in response to pressing movement of a clutch pedal. A first clutch switch is OFF when the clutch is in a fully engaged state wherein the clutch pedal is not pressed down, and switches to ON when the clutch is in a partially engaged state as the clutch pedal is pressed down. A second clutch switch is OFF when the clutch is in a fully released state wherein the clutch pedal is fully pressed down, and switches to ON when the clutch is in a partially engaged state after partial return of the clutch pedal from the fully pressed down position. A motor controller responds to the clutch switches to stop driving and power generation of the motor when the first clutch switch switches to ON from OFF. The motor controller also assists in starting the engine, as an assist condition of a motor in a starting drive mode from a stopping mode of the vehicle, when an idle switch is OFF, when vehicle speed is zero or nearly zero, and when the second clutch switch becomes OFF from ON, the motor controller sets a flag. At the state that the flag is set, when the second clutch switch becomes ON from OFF, motor driving to assist engine start-up occurs.

9 Claims, 13 Drawing Sheets

MOTOR DRIVING (ASSIST)

IDLE-STOP WHEN A VEHICLE SPEED (Ne)
IS LOWER THAN "R"
· TROUBLE OF ENGINE SYSYTEM
· A ROUGH CLUTCH-MEET WITH
  AN INDISTINCT AIM IN STARTING

FIG. 5

SPECIAL EXERCISE1 : START ASSIST

FOLLOWING TABLE SHOWS START-ASSIST SWITCHOVER AND
START-ASSIST CANCELLATION CONDITIONS.

A MODIFICATION IS A PART REFLECTING CLUTCH-CUT-FLAG
MODE IN A SWITCHOVER CONDITION.

| | VEHICLE VELOCITY | MOTOR SPEED | CLUTCH -SW1 | CLUTCH -SW2 | BRAKE -S/W | IDLE -S/W | GEAR | TORQUE ORDER | NOTE |
|---|---|---|---|---|---|---|---|---|---|
| SWITCHOVER CONDITION | 4.5km/h UNDER | 100~ 1700rpm | ON | ON AND CLUTCH-CUT FLAG:ON | OFF | OFF | / | MAP- AST | |
| CANCELLATION CONDITION | ·10km/h UP ·1~ 10km/h FOR 10s | MORE THAN 1750rpm | OFF → ON | OFF | ON | ON | / | | |

FIG.11

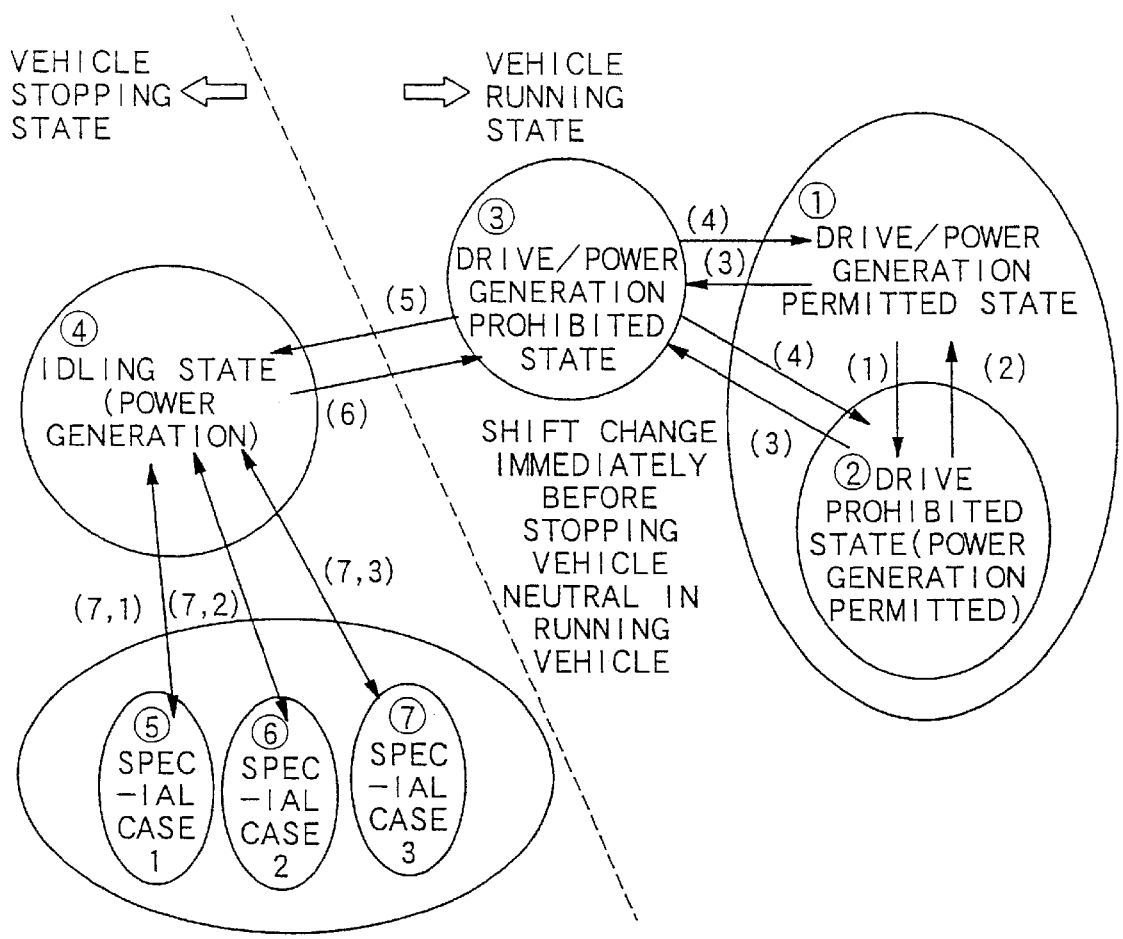

① DRIVE/POWER GENERATION PERMITTED:DRIVE/POWER GENERATION CONTROL

② DRIVE PROHIBITED(POWER GENERATION PERMITTED): POWER GENERATION CONTROL(VEHICLE RUNNING)

③ DRIVE/POWER GENERATION PROHIBITED:MOTOR CONTROL PROHIBITED

④ IDLING:POWER GENERATION CONTROL

⑤ SPECIAL CASE 1(VEHICLE STARTING STATE): DRIVING CONTROL

⑥ SPECIAL CASE 2(ENGINE STARTING STATE):DRIVING CONTROL (VEHICLE STATIONARY)

⑦ SPECIAL CASE 3(IDLING STABILIZING CONTROL STATE): DRIVING CONTROL

FIG.13
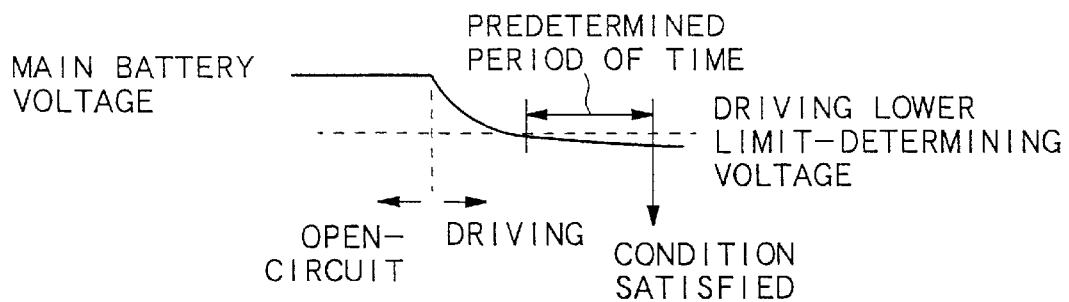
FIG.14
| MAP | DRIVING TORQUE |
|---|---|
| MOTOR SPEED | DRIVING LOWER LIMIT-DETERMINING VOLTAGE |
FIG.15
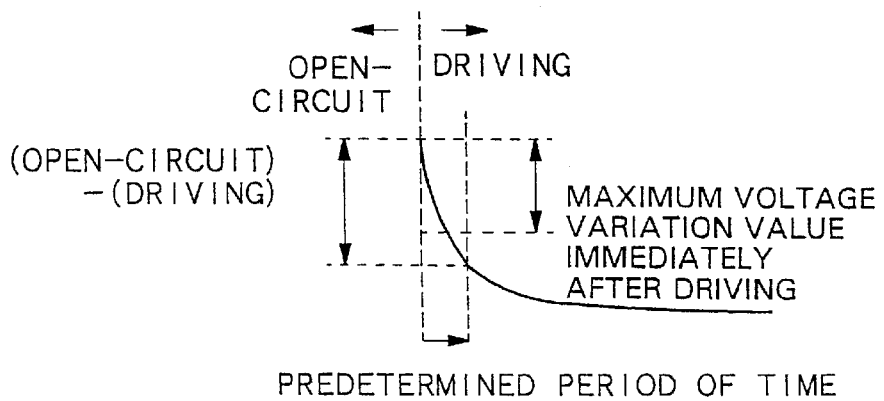
FIG.16
| MAP | DRIVING TORQUE |
|---|---|
| MOTOR SPEED | MAXIMUM VOLTAGE VARIATION VALUE IMMEDIATELY AFTER DRIVING |

FIG. 17
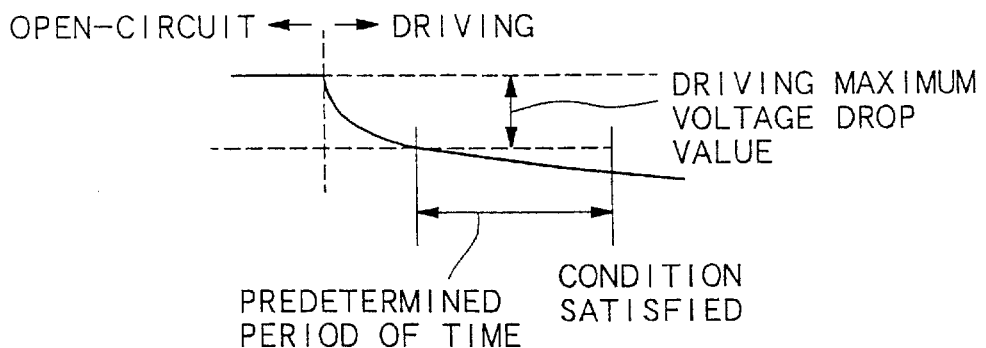
FIG. 18
| MAP | DRIVING TORQUE |
|---|---|
| MOTOR SPEED | DRIVING MAXIMUM VOLTAGE DROP VALUE |
FIG. 19
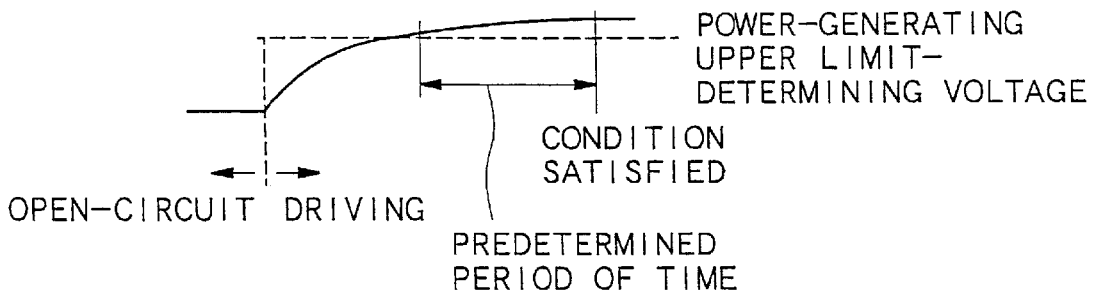
FIG. 20
| MAP | POWER-GENERATION TORQUE |
|---|---|
| MOTOR SPEED | POWER GENERATING UPPER LIMIT-DETERMINING VOLTAGE |

MOTOR CONTROL APPARATUS COMBINED TO ENGINE

CROSS REFERENCE TO RELATED APPLICATIONS

This application is related to copending applications Ser. No. 09/672,634 and Ser. No. 09/672,633, both titled "MOTOR CONTROL APPARATUS COMBINED TO ENGINE" and both filed Sep. 28, 2000. The disclosures of the related applications are, in their entirety, incorporated herein by reference.

FIELD OF THE INVENTION

This invention relates to a motor control apparatus combined with a vehicle engine, and particularly to a motor control apparatus having a clutch connected between a transmission and an engine-motor arrangement.

BACKGROUND OF THE INVENTION

In a vehicle, there is a known motor control apparatus combined with an engine-motor arrangement which connects to a transmission through a clutch. The control apparatus for the motor, which has both driving and power-generating functions to the engine, controls driving and power-generating states of the motor during stop and traveling set on the basis of a driving state of the vehicle and a running state of the engine. Such a control system attains a high level of required performance (such as fuel efficiency, lower values of detrimental components in exhaust gases, and power performance).

One example of such control apparatus for a vehicle is disclosed in published Japanese Patent Application Laid-Open No. 9-74602. The control apparatus indicated in this disclosure uses the pressure of fluid to determine a half combined or semi-connected state of a clutch (i.e. a half clutch), and when the clutch is in a half combined state, the control apparatus stops driving of the motor in order to protect the clutch.

In case of the control apparatus for a vehicle as disclosed in the above publication, as the motor stops driving after the clutch becomes in a half combined state because of determining a half combined state of the clutch by the pressure of fluid, the purpose of the clutch press or moving operation as caused by a person driving the vehicle is not reflected. On this account there is a drawback in that the control apparatus may control to drive the motor as if an engine will blow at an assist state, and will stall at a power-generating state. In addition, as the control apparatus needs circuitry fluid, there is a drawback in that the structure becomes complicated.

Furthermore, in a starting drive state from a stopping state of a vehicle, when the clutch is operated incompletely, there is drawback in that the vehicle can not smoothly start if the motor assists in starting the engine.

In order to obviate or minimize the above inconveniences, the present invention provides a motor control apparatus combined with an engine which is disposed in a vehicle, and which is connected to a transmission through a clutch, and which connects a motor having both driving and power-generating functions to a motor control means for controlling both driving and power-generating states of the motor when in a stopping control mode and a traveling control mode as a selected control mode that is based on an operating state of the vehicle. The control apparatus includes (releasing) clutch switches which are switched on or off by operating a clutch pedal for letting in or out (engaging) the clutch. A first clutch switch is off when the clutch is in a fully combined (i.e. engaged) state when the clutch pedal is not pressed down, and switches to on when the clutch is in a half combined state if the clutch pedal is pressed down. A second clutch switch is off when the clutch is in a fully released (i.e. disengaged) state wherein the clutch pedal is fully pressed down, and switches to on when the clutch is in a half combined state after partial return or release of the clutch pedal from the fully pressed down position. A motor control means stops driving and power generation of the motor when the first clutch switch switches to on from off.

The present invention also provides a motor control apparatus combined with an engine which is disposed in a vehicle and which is connected to a transmission through a clutch, and which connects a motor having both driving and power-generating functions to a motor control means for controlling both driving and power-generating states of the motor when in a stopping control mode and a traveling control mode as a selected control mode that is based on an operating state of the vehicle. The control apparatus includes (releasing) clutch switches which are switched off by operating a clutch pedal for letting in or out (engaging) the clutch. A first clutch switch is off when the clutch is a fully combined (i.e. engaged) state when the clutch pedal is not pressed down, and switches to on when the clutch is in a half combined state if the clutch pedal is pressed down. A second clutch switch is off when the clutch is in a fully released (i.e. disengaged) state wherein the clutch pedal is fully pressed down, and switches to on when the clutch is in a half combined state after partial return or release of the clutch pedal from the fully pressed down position. The control apparatus includes a motor control means to assist in starting the engine, as an assist condition of a motor in a starting drive mode of a vehicle, when an idle switch is off, when vehicle speed is zero or nearly zero, and when the second clutch switch becomes off from on, then the motor control means sets a flag, and at the state that the flag is set, when the second clutch switch becomes on from off.

According to this invention, firstly, when a clutch pedal is pressed down in order to release the clutch, during drive of the motor, and when the first clutch switch switches to on from off, then driving and power generation of the motor are stopped immediately at a half combined state of the clutch. Thus, the purpose of a person driving the vehicle for operating the clutch can be taken into account and the driving and the power generation of the motor are stopped before the clutch becomes in a half combined state, and consequently it can avoid the inconvenience of driving the motor in error to prevent an engine from blowing or stalling.

Secondly, as an assist condition of the motor in a starting drive state from a stopping state of the vehicle, when an idle switch is off, when vehicle speed is zero or nearly zero, and when the second clutch switch becomes off from on, then the motor control means sets a flag, and at the state that the flag is set, when the second clutch switch becomes on from off, then the motor control means to assist in starting the engine provides control over the motor so as not to drive the motor and then assist in starting the engine even if a clutch is operated incompletely, and consequently a smooth vehicle start can be achieved.

BRIEF DESCRIPTION OF THE DRAWINGS

FIG. 5 schematically illustrates each condition assisting in starting up;

FIG. 11 schematically illustrates switching over between the stopping control mode and the traveling control mode;

FIG. 13 is a time-chart of the main battery voltage illustrating a driving lower limit-determination voltage;

FIG. 14 is a map of a driving lower limit-determination voltage by motor speed and driving torque;

FIG. 15 is a time-chart of the main battery voltage illustrating a maximum voltage variation value immediately after driving;

FIG. 16 is a map of a maximum voltage variation value immediately after driving by motor speed and driving torque;

FIG. 17 is a time-chart of the main battery voltage illustrating a driving maximum voltage drop value;

FIG. 18 is a map of a driving maximum voltage drop value by motor speed and driving torque;

FIG. 19 is a time-chart of the main battery voltage illustrating a power-generating upper limit-determining voltage; and FIG. 20 is a map of a power-generating upper limit-determining voltage by motor speed and driving torque.

DETAILED DESCRIPTION

The present invention will now be described in specific detail with reference to FIGS. 1–20 which illustrate an embodiment of this invention.

Figure 8:
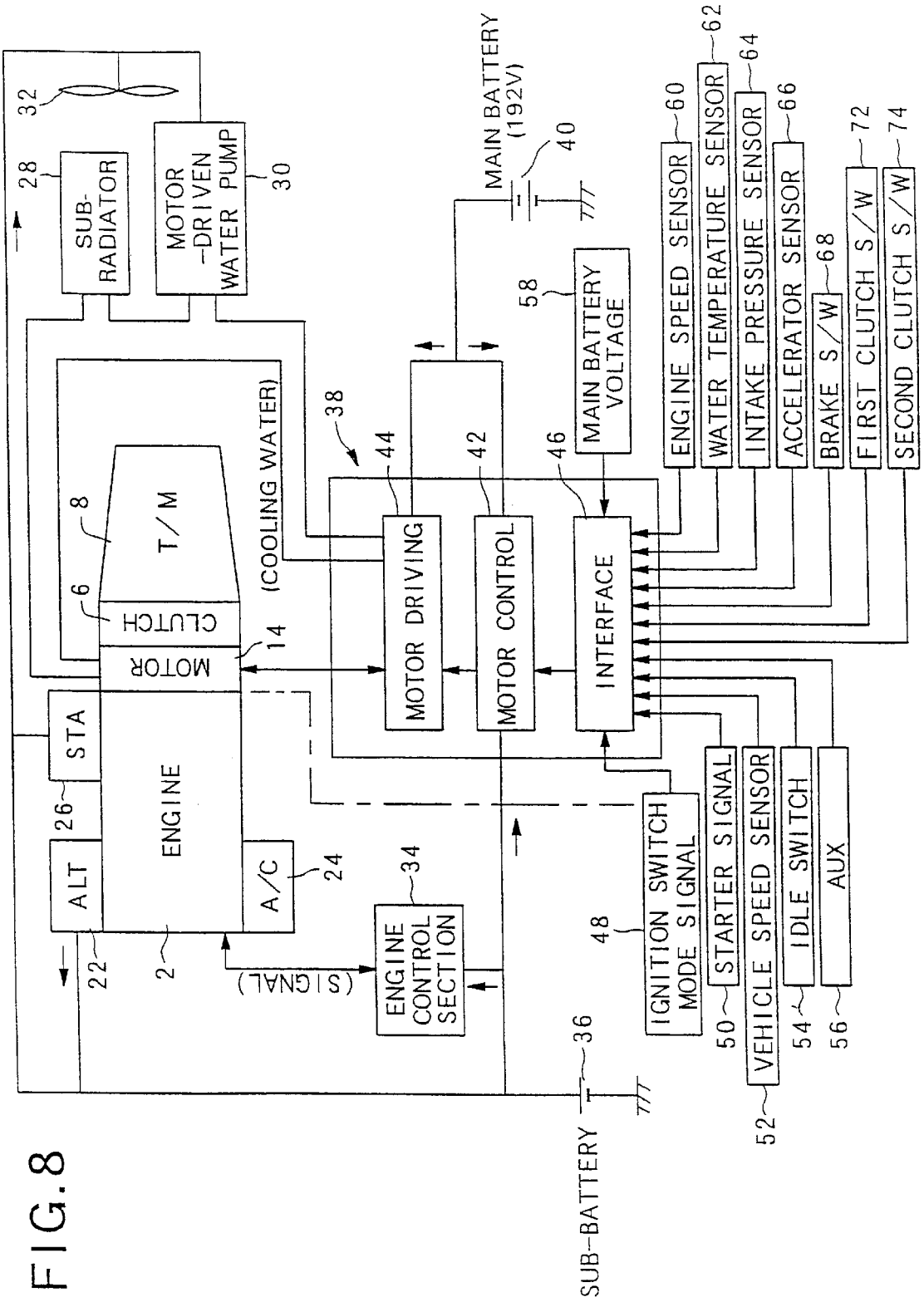
FIG. 8 is a block diagram illustrating a system of a motor control means.
Figure 9:
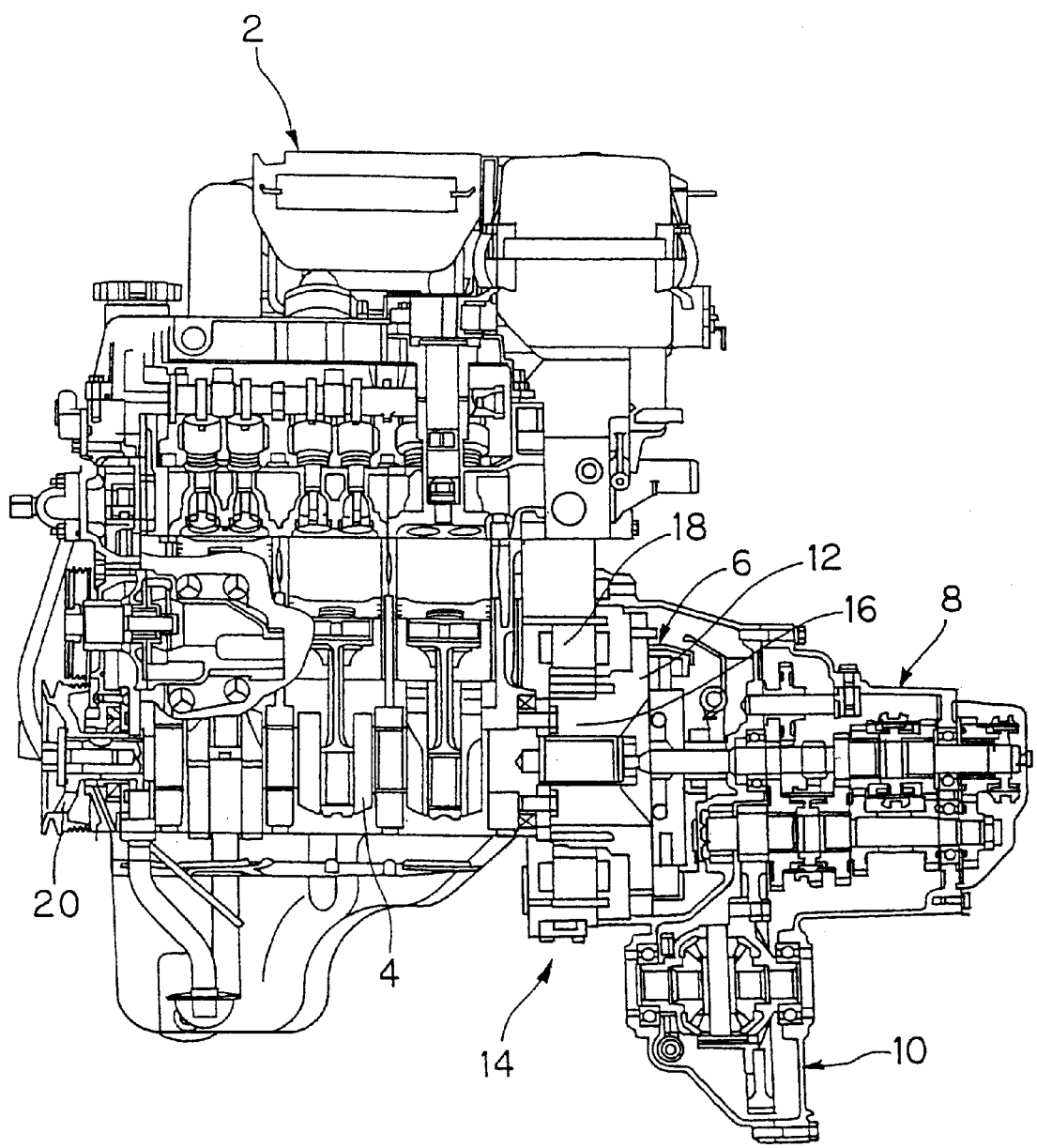
FIG. 9 is a schematic cross-sectional view illustrating a power transmission system wherein a motor is disposed at one end of the crank shaft.

In FIGS. 8 and 9, reference numeral 2 denotes an engine disposed in a vehicle (not shown); 4 a crank shaft associated with the engine; 8 a transmission; and, 10 an auxiliary output. The engine 2 operates by combustion of fuel. The clutch 6, which is positioned between engine 2 and the transmission 8, communicates or interrupts the engine output from the engine 2 to the transmission 8. A motor 14 is connected directly to the crankshaft at one end side of a flywheel 12 which is positioned at the input end of the transmission 8. This motor 14, as shown in FIG. 9, consists of a rotor 16 and a stator 18, and has a driving function to drive by electricity energy, and a power-generating function.

Figure 10:
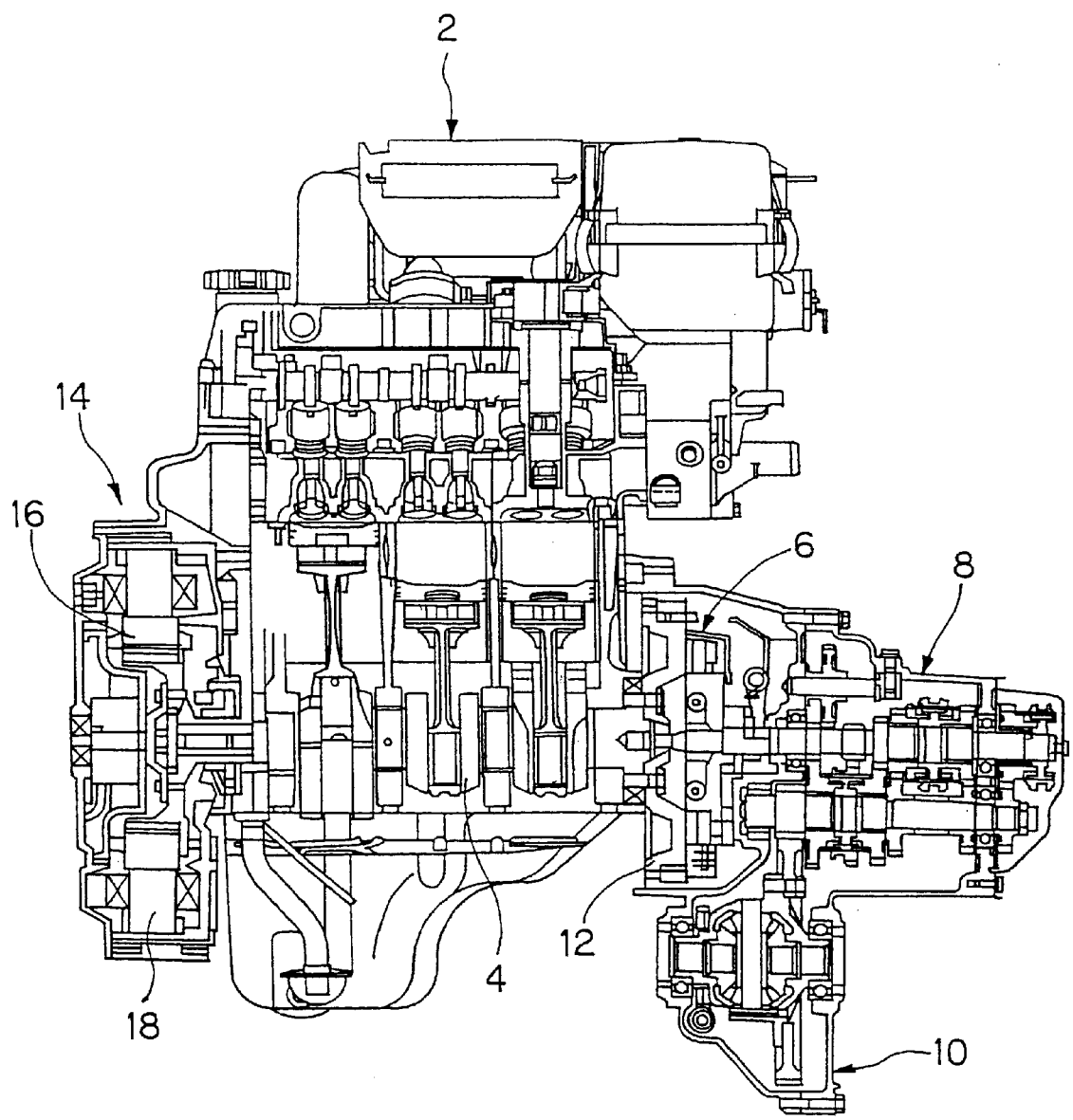
FIG. 10 is a schematic cross-sectional view, illustrating a variation of a power transmission system wherein a motor is disposed adjacent the other end of the crank shaft.

As a variation, as shown in FIG. 10, the motor 14 can be mounted at the other end of the crank shaft 4 adjacent a crank pulley 20.

The engine 2 includes (FIG. 8) an alternator (ALT) 22 for power generation, an air-conditioner compressor 24 for an air-conditioner (A/C), a starter (STA) 26 for vehicle starting, a sub-radiator 28, and an electric water pump 30. The alternator 22 and the air-conditioner compressor 24 are driven by belt (not shown) entrained on the crank pulley 20.

The starter 26 is connected to the flywheel 12 through a gear mechanism (not shown). A fan 32 is connected to the sub-radiator 28.

The engine 2 is connected to an engine control means 34 to control the engine 2. The engine control means 34 is linked to a sub-battery 36. The sub-battery 36 is coupled to the alternator 22, the stator 26, the electric water pump 30, and the radiator fan 32.

The motor 14 is connected to the motor control means 38 which is linked to the sub-battery 36, and is also coupled to a main battery 40. The main battery 40 supplies driving electric power to the motor 14, and is charged by generated electric power from the motor 14.

The motor control means 38, as shown in FIG. 8, includes a motor control section 42, a motor-driving section 44, and an input/output-processing section (interface) 46.

The input/output-processing section 46 of the motor control means 38 connects with an ignition switch 48 which is turned on by an ignition key (not shown), a starter switch 50 which becomes on when the starter 26 operates, a vehicle speed sensor 52 to detect a vehicle speed state, an idle switch 54 which becomes on when the engine 2 is in an idle driving state, a supporting (AUX) sensor 56, a main battery voltage detector 58 to detect the voltage state of the main battery 40, an engine speed sensor 60 to detect engine speed, a water temperature sensor 62 to detect the engine coolant temperature, an intake pressure sensor 64 to detect engine load, an accelerator sensor 66 to detect a state of stepping on or depressing an accelerator pedal (not shown), and a brakes switch 68 which becomes on when a brakes pedal (not shown) is stepped on or depressed.

Figure 3:
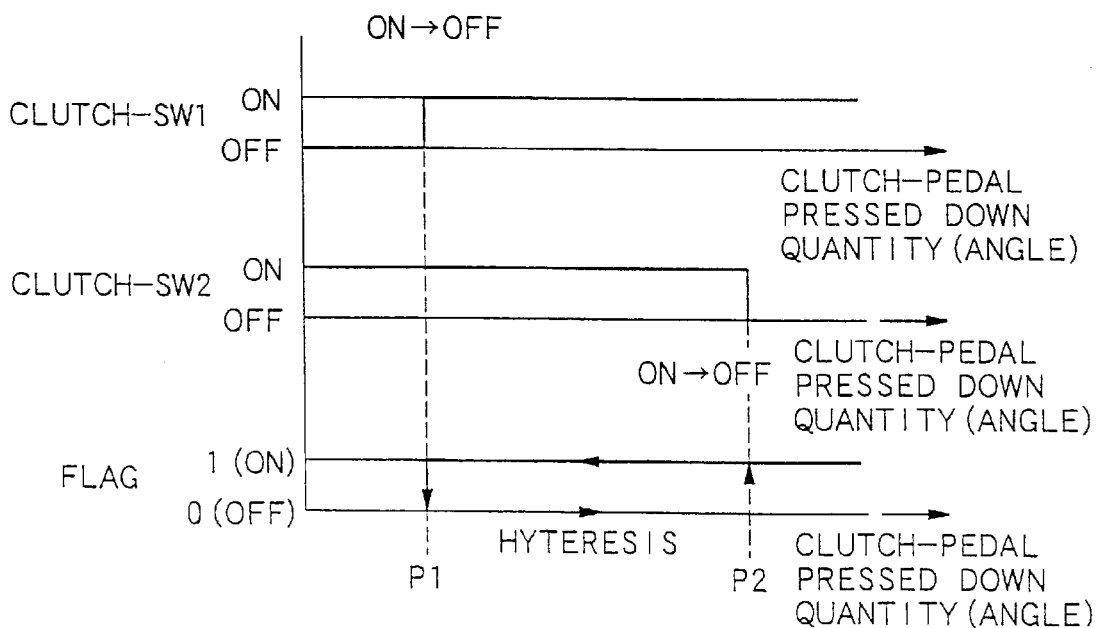
FIG. 3 schematically illustrates an on/off mode of flag for each clutch switch.
Figure 4:
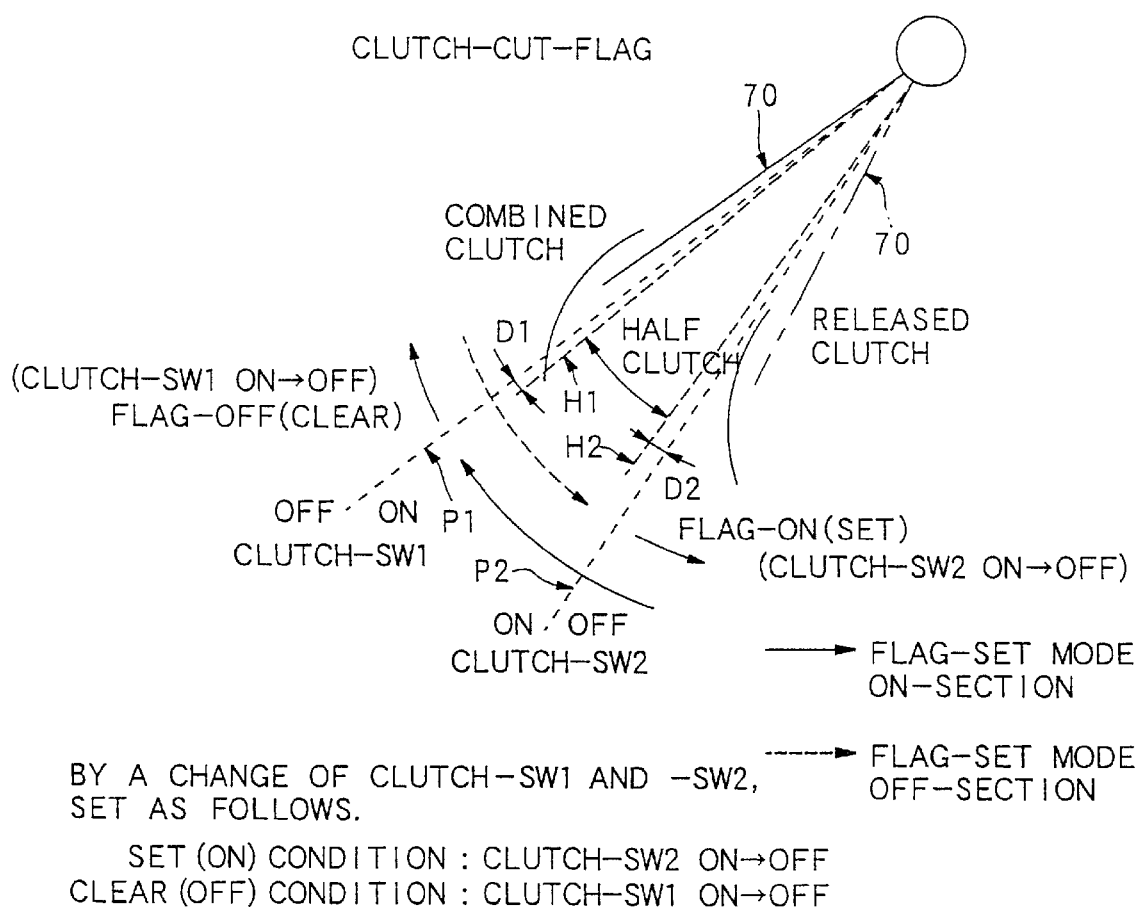
FIG. 4 schematically illustrates an operating mode for each clutch switch in a clutch press operation.

In addition, the input/output-processing section 46 of the motor control means 38 connects to more than one clutch switch (two, for example) which become on or off by the clutch press operation, i.e. the positional state of clutch pedal 70 (see FIG. 4). Therefore, the motor control means 38 connects to a first clutch switch (switch SW1) 72, and to a second clutch switch (switch SW2) 74. The first clutch switch SW1, as shown in FIGS. 3 and 4, is disposed in a press starting position of the clutch pedal 70, and is off when the clutch pedal 70 is not pressed down and clutch 6 is fully combined (i.e. engaged). The first clutch switch SW1 becomes on when the clutch pedal 70 is pressed down and the clutch 6 is placed at H1 at a distance 'D1' from a transition region P1 between the combined (i.e. fully engaged) clutch and the half (i.e., partially engaged) clutch states, and is maintained in the on state when the clutch pedal 70 is further pressed down. The second clutch switch SW2 is disposed in a press ending position of the clutch pedal 70, and is off when the clutch pedal 70 is fully pressed down and clutch 6 is fully released (i.e. disengaged). The second clutch switch SW2 becomes on when the clutch pedal 70 is returned from the fully pressed down state and the clutch 6 is placed at H2 at a distance 'D2' from a transition region between the released clutch and half clutch states, and is maintained in the on state when the clutch pedal 70 is further released.

The motor control means 38 exchanges no data with the engine control means 34. More specifically, the motor control means 38 is independent of the control over the engine 2 by the engine control means 34, and thus motor control means 38 independently controls and determines the driving and power-generating states of the motor 14.

The motor control means 38, as shown in FIG. 11, is set into a stopping control mode and a traveling control mode, which control modes are based on the running state of the vehicle. In addition, the motor control means 38 is at first put into a drive/power generation-prohibiting control mode when switching over between the stopping control mode and the traveling control mode. In this way, the motor control means 38 executes control over the motor 14. The drive/generation-prohibiting control mode prohibits both driving and power generation of the motor 14.

The motor control means 38 receives a main battery voltage signal from the main battery voltage detector 58. The detector 58 detects the voltage of the main battery 40. The battery 40 supplies driving electric power to the motor 14 or is charged by generated electric power from the motor 14. Further, the motor control means 38, as shown in FIG. 12, has control over the main battery 40 in such a manner that a main battery mode is governed according to the main battery voltage.

The stopping control mode of the motor control means 38, as shown in FIG. 11, may be set into an idling power generation control mode which includes a vehicle starting drive control mode, an engine start-up drive control mode, and an idle-stabilized drive control mode. When in the idling power generation control mode, the motor control means 38 assumes control over the motor 14 so as to permit the motor 14 to generate power and then charge the main battery 40 therewith. When in the starting vehicle motion drive control mode, the motor control means 38 executes control over the motor 14 so as to drive the motor 14 and then assists in starting the vehicle. In the engine start-up drive control mode, the motor control means 38 provides control over the motor 14 so as to drive the motor 14 and then assists in starting up the engine 2. In the idle-stabilized drive control mode, the motor control means 38 provides control over the motor 14 so as to drive the motor 6 and stabilize idling of the engine 2. A switchover and a cancellation conditions to assist in starting the vehicle (see special case 1 in FIG. 11), as shown in FIG. 5, may be set in a vehicle speed state, a motor speed state, an on/off state of the first and the second clutch switches, an on/off state of the brake switch, and an on/off state of the idle switches.

The traveling control mode of the motor control means 38, as shown in FIG. 11, may be set into a drive/power generation-permitting control mode, a drive-prohibiting control mode, and a drive/power generation-prohibiting control mode. In the drive/power generation-permitting control mode, the motor control means 38 provides control over the motor 14 so as to permit either the driving or power generation of the motor 14. In the drive-prohibiting control mode, the motor control means 38 executes control over the motor 14 so as to prohibit the driving of the motor 14, but to permit the motor 14 to generate power. In the drive/power generation-prohibiting control mode, the motor control means 38 executes control over the motor 14 so as to prohibit both the driving and power generation of the motor 14.

Figure 12:
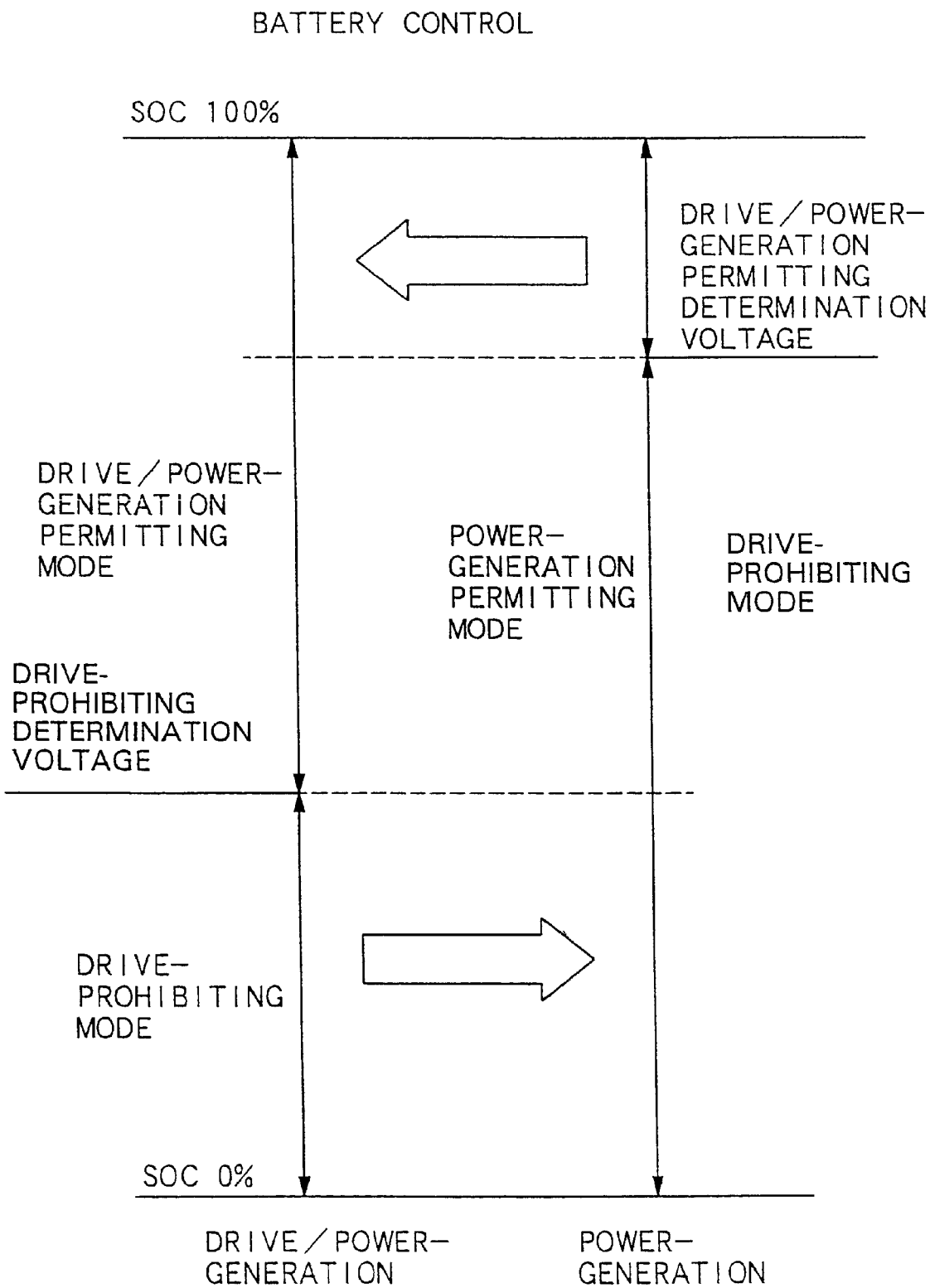
FIG. 12 schematically illustrates controlling a main battery.

The motor control means 38, as shown in FIG. 12, switches over between the above-described drive/power generation-permitting control mode and drive-prohibiting control mode according to the voltage of the main battery 40 governed by the motor control means 38.

More specifically, as shown in FIG. 12, when the main battery voltage is charged at 100% (SOC, i.e. state of charging), then the motor control means 38 is in the drive/power generation-permitting control mode, and assumes control over the motor 14 so as to permit either the driving or power generation of the motor 14. However, when the main battery voltage falls below a lower limit or a drive-prohibiting determination voltage, then the motor control means 38 is put into the drive-prohibiting control mode.

In the drive-prohibiting control mode, the motor control means 38 gains control over the motor 14 so as to prohibit the driving of the motor 14, but to permit the motor 14 to generate power until the main battery voltage reaches a drive/power generation-permitting determination voltage. When the main battery voltage exceeds the drive/power generation-permitting determination voltage, then the motor control means 38 is returned to the drive/power generation-permitting control mode. In this mode, the motor control means 38 effects control over the motor 14 so as to permit both the driving and power generation of the motor 14.

The transition from the drive/power generation-permitting control mode to the drive-prohibiting control mode is made when any one of the following transitional conditions is satisfied:

(1) A main battery open-circuit voltage continues to be less than the drive-prohibiting determination voltage for a predetermined period of time;

(2) A driving main battery voltage continues to be less than a driving lower limit-determining voltage (a set value for each driving torque) for a predetermined period of time (see FIGS. 13 and 14);

(3) A value obtained from the main battery open-circuit voltage minus a driving voltage is greater than a maximum voltage variation value immediately after driving (a set value for each driving torque) when a predetermined period of time elapses after the motor 14 starts its driving (see FIGS. 15 and 16);

(4) The main battery open-circuit voltage continues to be greater than a driving maximum voltage drop value (a set value for each driving torque) for a predetermined period of time (see FIGS. 17 and 18); and (5) The motor 14 is caused to stop after a predetermined period of time elapses after the driving of the motor 14 starts, and when the open-circuit voltage of the main battery is then detected and found to be continually less than the drive-prohibiting determination voltage (a set value for each torque) for a predetermined period of time.

In addition, when the above No. (5) condition is unsatisfied, then the motor 14 resumes its driving state to assist in propelling the vehicle.

Another transition from the drive-prohibiting control mode to the drive/power generation-permitting control mode is made when any one of the following transitional condition is met:

(1) The main battery open voltage continues to be greater than the drive/power generation-permitting determination voltage over a predetermined period of time;

(2) A power-generating main battery voltage continues to be greater than a power-generating upper limit-determining voltage (a set value for each power-generating torque) for a predetermined period of time (see FIGS. 19 and 20);

(3) The motor 14 is caused to stop generating power when a predetermined period of time elapses after the motor 14 starts generating power, and then the main battery open-circuit voltage is detected; and the main battery open-circuit voltage continues to be greater than the drive/power generation-permitting determination voltage over a predetermined period of time.

In addition, when a determination as to the above transitional condition No. (3) is terminated, then the motor control means 38 is put back into the control mode that was operative before such a determination was made, regardless of whether or not the above transitional condition No. (3) was met. Then, the motor control means 38 maintains such control. In addition, the time when the motor control means 38 is returned to the aforesaid control mode is newly defined as a power generation-starting time.

The motor control means 38 executes control over the motor 14 so as to prohibit both the driving and power generation of the motor 14, when the first clutch switch SW1 switches to on from off (see (6) and (3) in FIG. 11). Furthermore, as a conditions that the motor assists in starting the vehicle (to determine the starting), when the idle switch 54 is off (when the accelerator pedal is pressed down), when a vehicle speed is zero or nearly zero (during stops), and when the second clutch switch SW2 becomes off from on, then the motor control means 38 sets a flag "1", and at the state that the flag "1" is set, when the second clutch switch becomes on from off, then the motor control means 38 provides control over the motor so as to drive the motor (see (7.1): special case 1 in FIG. 11). In this case, as shown in FIG. 3, there is a hysteresis in the flag between on "1" and off "0", depending on the on/off state of the first clutch switch SW1 and the second clutch switch SW2. In a reason, as shown in FIGS. 3 and 4, when the second clutch switch SW2 becomes off, then the flag is set to "1", and the flag "1" is maintained until the first clutch switch 72 becomes off after the clutch pedal 70 is returned.

Next, the operation of the invention will be briefly described with reference to the control flowchart in FIGS. 6 and 7.

As shown in FIG. 11, the motor control means 38 is set into the stopping control mode and the traveling control mode based on the operating state of the vehicle.

Figure 6:
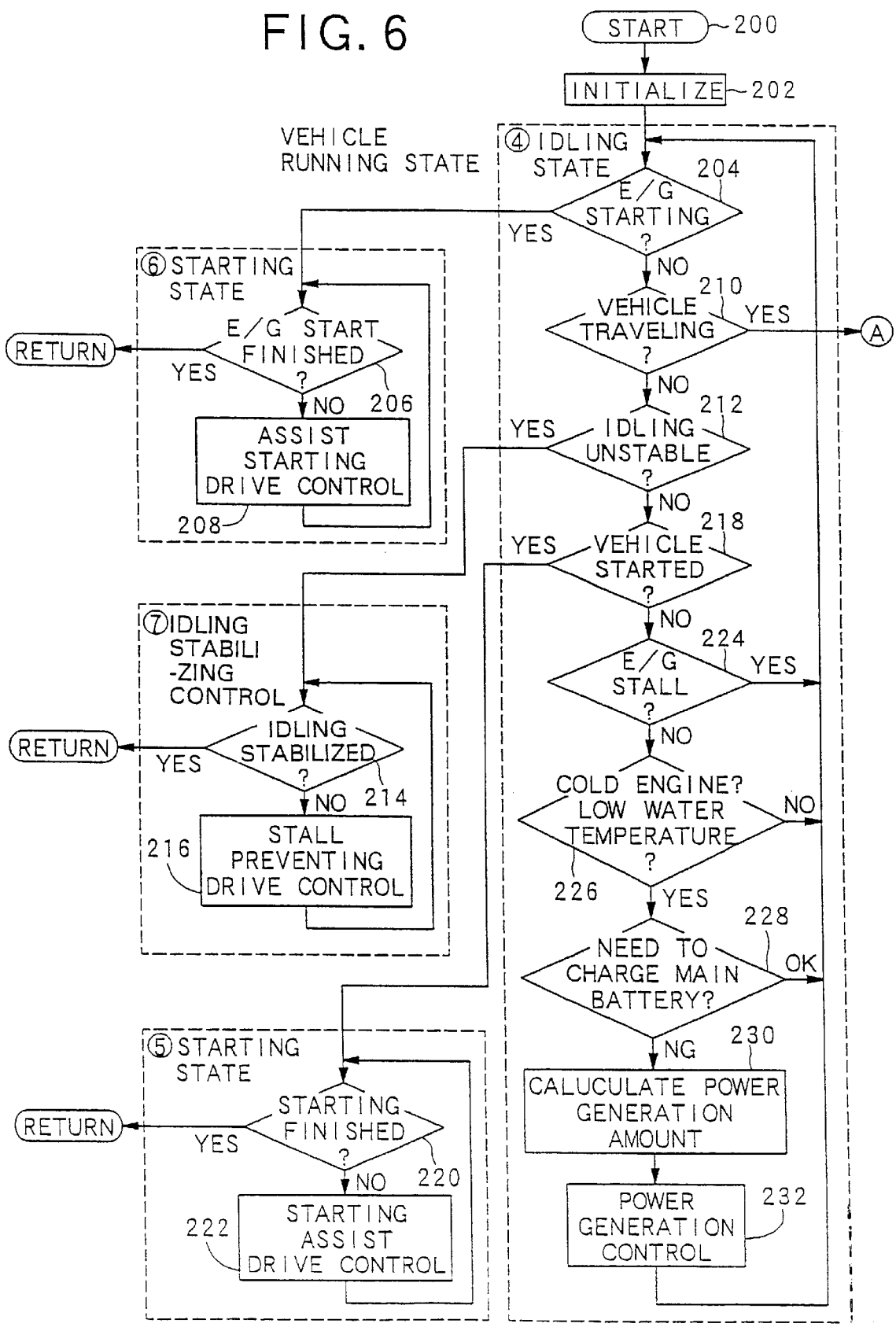
FIG. 6 is a control flowchart in a stopping control mode.

Referring now to FIG. 6, when the motor control means 38 is in the stopping control mode, it starts control at step 200, then the program is initialized at step 202. Then, a determination is made at step 204 as to whether the engine 2 is starting up.

When the determination in step 204 results in "YES", then it is determined at step 206 whether the "start-up" of the engine 2 has been completed. When the determination in step 206 is "YES", then the routine is returned to previous step 204. However, when the answer to the determination in step 206 is "NO", then the motor control means 38 is put into a start-up drive control mode. The motor control means 38 then provides control over the motor 14 at step 208 so as to drive the motor 14 and assist in starting the engine 2. Then, the routine is returned to previous step 206.

When the determination in previous step 204 is "NO", then a determination is made at step 210 as to whether the vehicle is traveling. When the answer to the determination in step 210 is "YES", then the motor control means 38 is shifted to the traveling control mode as hereinafter described. When the determination in step 210 is "NO", then it is determined at step 212 whether idling is unstable.

When the determination in step 212 results in "YES", then it is determined at step 214 whether such idling has been stabilized. When the determination in step 214 is "YES", then the routine is returned to previous step 212. However, when the determination in step 214 results in "NO", then the motor control means 38 is put into an idle-stabilized drive control mode. The motor control means 38 then executes control over the motor 14 at step 216 so as to drive the motor 14 and stabilize idling of the engine 2. Then, the routine is returned to previous step 214.

When the determination in previous step 212 results in "NO", then it is determined at step 218 whether the vehicle has started moving. When the determination in steps 218 is "YES", then a further determination is made at steps 220 as to whether such vehicle motion has started. When the determination in step 220 is "YES", then the routine is returned to previous step 218. However when the determination in step 220 results in "NO", then the motor control means 38 is put into a starting motion drive control mode. The motor control means 38 then effects control over the motor 14 at step 222 so as to drive the motor 14 and assist in starting motion the vehicle. Then, the routine is returned to previous step 220.

When the determination in previous step 218 is "NO", then it is determined at step 224 whether the engine 2 stalled. When the determination in step 224 is "YES", then the routine is returned to previous step 204. When the determination in step 224 is "NO", then a determination is made at step 226 as to whether the engine 2 is in a cold state and water temperature is low.

When the answer to the determination in step 226 is "NO", then the routine is returned to previous step 204. However, when the determination in step 226 results in "YES", then it is determined at step 228 whether the main battery 40 needs to be charged.

When the determination in step 228 results in "OK"because the main battery 40 need not be charged, then the routine is returned to previous step 204. However, when the determination in step 228 is "NG" because the main battery 40 must be charged, then a quantity of generated electric power is calculated at step 230. Further, the motor 14 is controlled at step 232 so as to generate power. Then, the routine is returned to previous step 204.

Figure 7:
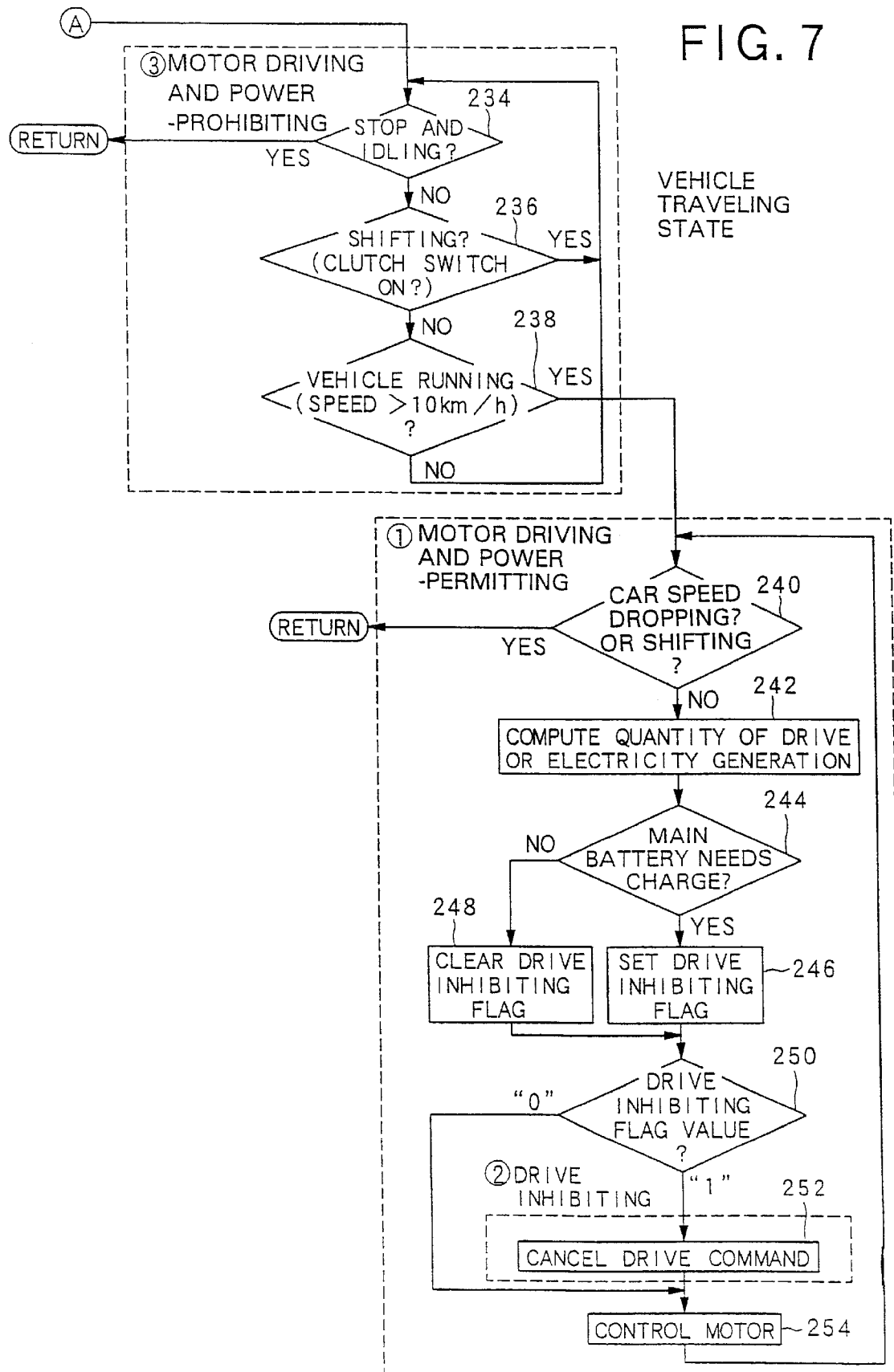
FIG. 7 is a control flowchart in a traveling control mode.

When the determination steps 210 is "YES" because the vehicle is traveling, then the motor control means 38 is at first put into a drive/power generation-prohibiting control mode, and control then shifts to the traveling control mode as illustrated in FIG. 7. In the drive/power generation-prohibiting control mode, a determination is made at step 234 as to whether the vehicle is halted in an idling state.

When the determination in step 234 is "YES", then the routine is returned to previous step 210 in the idling control mode. When the determination in step 234 is "NO", then it is determined at step 236 whether the first clutch switch 72 (i.e. SW1) is on and the second clutch switch 74 (i.e. SW2) is off (in the course of gear shifting or in a neutral position).

When the determination in step 236 is "YES", then the routine is returned to previous step 234. When the determination in step 236 is "NO", then it is determined at step 238 on the basis of a vehicle velocity signal from the vehicle velocity sensor 50 whether the vehicle is traveling.

When the determination in step 238 is "NO", the routine is returned to previous step 234. However, when the determination in step 238 is "YES", then the motor control means 38 shifts to a drive/power generation-permitting control mode in the traveling control mode. Then, a determination is made at step 240 as to whether vehicle velocity is on the decrease or the first clutch switch 72 (SW1) is on and the second clutch switch 74 (SW2) is off (in the course of gear shifting or in a neutral position).

When the determination in step 240 is "YES", then the routine is returned to previous step 234. When the determination in step 240 results in "NO", then either a driving electrical quantity or a quantity of generated electric power is calculated at step 242, thereby deciding on either a driving order or a power-generating order. It is then determined at step 244 whether the main battery 40 needs to be charged.

When the determination in step 244 is "YES" because the battery 40 needs to be charged, then a drive-prohibiting flag is processed at step 246 so as to be set to one value, here a "1". When the determination in step 244 is "NO" because the main battery 40 need not be charged, then the drive-prohibiting flag is processed at step 248 so as to be another value, here cleared to "0".

It is then determined at step 250 whether the drive-prohibiting flag is either "1" or "0". When the answer to the determination in step 250 is "1", then the motor control means 22 is shifted to a drive-prohibiting control mode. When the result from previous step 242 is the driving order, then the driving order of the motor 14 is canceled at step 252, and only the power-generating order is made effective. When the answer to the determination in step 250 is "0", then the result from previous step 242 is rendered operative. Then, the motor 14 is controlled at step 254 according to either the effective driving order or power-generating order. Thereafter, the routine is returned to previous step 240.

Figure 1:
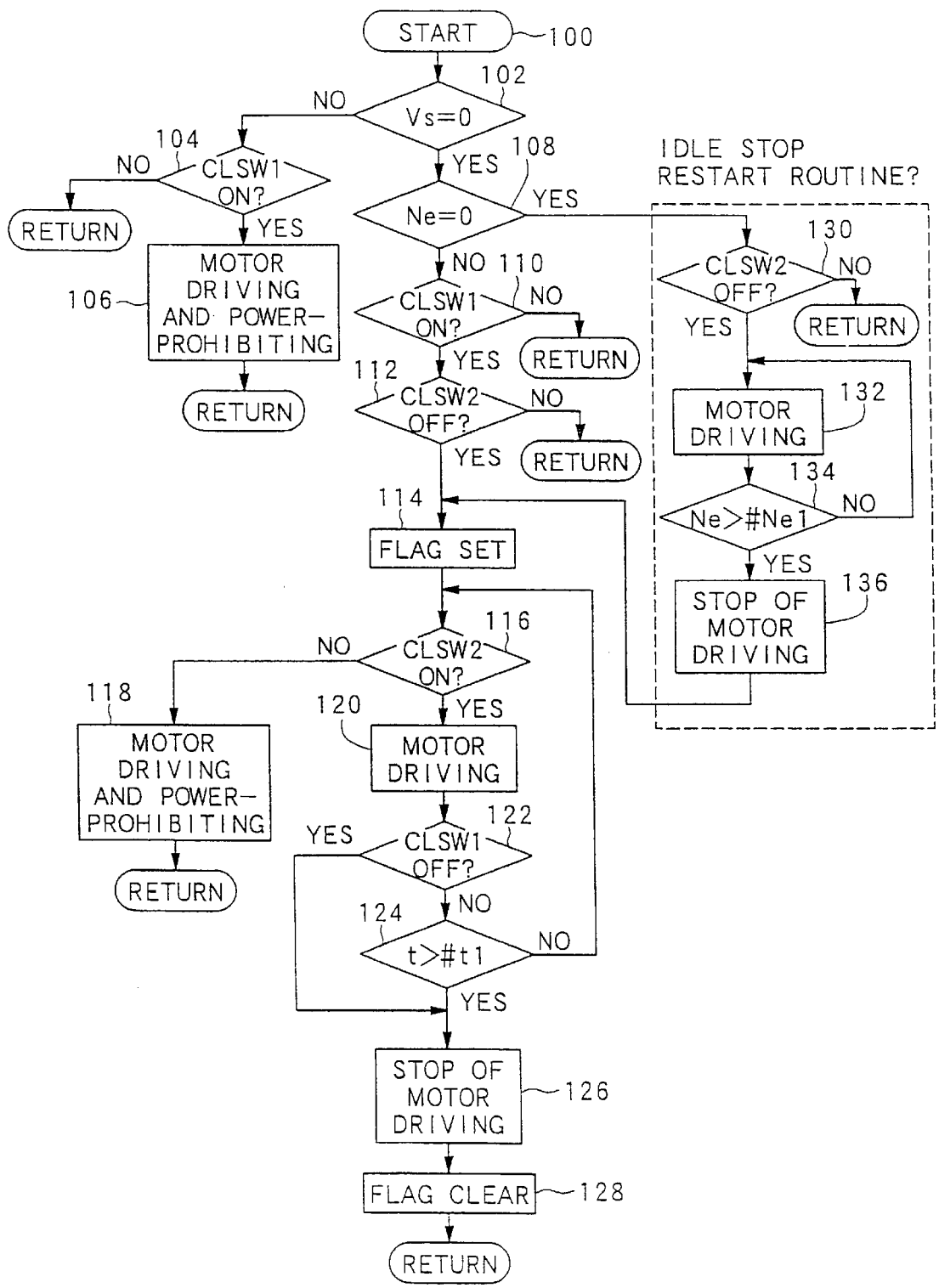
FIG. 1 is a motor drive control flowchart

According to the embodiment, in case of assisting in starting the vehicle in FIG. 6, the motor control means 38 controls so as to stop or drive the motor 14 according to the motor drive control flowchart in FIG. 1, depending on the on/off state of the first clutch switch 72 and the second clutch switch 74, as designated CLSW1 and CLSW2 in FIG. 1.

Therefore, when the motor drive control program starts at step 100, a determination is made at step 102 as to whether the vehicle velocity "Vs" is Vs=0.

When the answer to the determination in step 102 is "NO", then a determination is made at step 104 as to whether the first clutch switch 72 is on. When the answer to the determination in step 104 is "NO", then it is returned to the determination (102). When the answer to the determination in step 104 is "YES", then it is judged at step 106 to prohibit drive/power generation of motor 14. Then, the routine is returned to previous step 102.

When the answer to the determination in step 102 is "YES", then a determination is made at step 108 as to whether the engine speed "Ne" is Ne=0.

When the answer to the determination in step 108 is "NO", then a determination is made at step 110 as to whether the first clutch switch 72 is on. When the answer to the determination in step 110 is "NO", then it is returned to the determination (102). When the answer to the determination in step 110 is "YES", then a determination is made at step 112 as to whether the second clutch switch 74 is off. When the answer to the determination in step 112 is "NO", then the routine is returned to previous step 102.

When the answer to the determination in step 112 is "YES", then the motor control means 38 sets a flag to "1"at step 114.

When the answer to the determination in step 112 is "YES", then a determination is also made at step 116 as to whether the second clutch switch 74 is on. When the answer to the determination in step 116 is "NO", then it is judged at step 118 to prohibit a drive/power generation of motor 14. Then the routine is returned to previous step 102.

Figure 2:
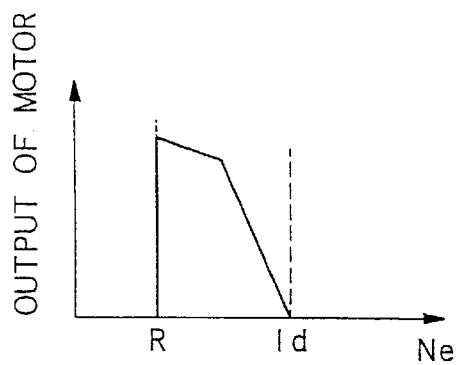
FIG. 2 is a time-chart for driving a motor in the motor control means shown in FIG. 1.

When the answer to the determination in step 116 is "YES", then the motor control means 38 controls to drive the motor 14. Therefore, as shown in FIG. 2, the motor control means 38 provides control over the motor 14 so as to assist in starting the engine. Here, when the vehicle velocity "Ne" is higher than a predetermined value "R" set up so as to be lower than an idle rotational number "id", then the motor control means provides to assist. But, when the vehicle velocity "Ne" is lower than the predetermined value "R", the motor control means stops control over the motor 14 so as to assist in starting the engine because of a trouble of engine system, an indistinct aim in starting the engine and a rough clutch-meet (engaging).

When the answer to the determination in step 112 is "YES", then a determination is made at step 122 as to whether the first clutch switch 72 is off. When the answer to the determination in step 122 is "NO", then it is judged at step 124 as to whether the time count "t" after the motor 14 starts its driving is over a predetermined value "#t1" (t>#t1). When the answer to the determination in step 124 is "NO", then the routine is returned to previous step 116.

When the answer to the determination in step 124 is "YES", or when the answer to the determination in step 122 is "YES", then it is judged at step 126 to stop the driving of motor 14. And then, the motor control means 38 clears a flag to "0" at step 128. Then the routine is returned to previous step 102.

When the answer to the determination in step 108 is "YES", then a determination is made at step 130 as to whether the second clutch switch 74 is off in the idle stop/starting routine. When the answer to the determination in step 130 is "NO", then the routine is returned to previous step 102.

When the answer to the determination in step 130 is "YES", then the motor control means 38 drives the motor 14, then a determination is made at step 134 as to whether the engine speed is over a predetermined valued "#Ne1" (Ne>#Ne1). When the answer to the determination in step 134 is "NO", then the routine is returned to previous step 132.

When the answer to the determination in step 134 is "YES", then the motor control means 38 stops to drive the motor 14, and sets a flag at step 114.

As a result, when a person driving the vehicle depresses or releases the clutch 6, then the purpose of the clutch press operation of the driving person is reflected by a movement of a clutch pedal 70. Therefore, during drive of the motor 14, when the first clutch switch 72 switches to on from off, then the motor control means 38 executes control over the motor 14 so as to prohibit both the driving and power generation of the motor 14, and then when the clutch pedal 70 is pressed down in order to release the clutch 6, the driving and the power generation of the motor 14 are stopped immediately at a half combined (i.e. partially engaged) state of a clutch 6. Thus, a purpose of a driving person in operating the clutch 6 can be reflected, and the driving and the power generation of the motor 14 are stopped before the clutch 6 moves to the half combined state. Consequently, it can avoid the inconvenience of driving the motor 14 in error as if an engine 2 will blow at an assist state, and will stall at a power-generating state, and it can prevent that an engine 2 will blow or stall.

Also, as an assist condition of the motor 14 in a starting drive mode from a stopping mode of a vehicle, when the idle switch 54 is off, when the vehicle speed is zero or nearly zero, and when the second clutch switch 74 switches to off from on, then the motor control means sets a flag, and at the state that the flag is set, when the second clutch switch 74 switches to on from off, then the motor control means assists in starting the engine and provides control over the motor 14 so as not to drive the motor 14 and then assist in starting the engine even if clutch pedal 70 is operated incompletely, consequently a vehicle can start smoothly.

In addition, in the case of this embodiment, a fluid system is not needed, and the structure does not become complicated.

Furthermore, in the case of this invention, as a pressed-down speed of the clutch pedal is considered so as to change the on/off changing time of the clutch switch (positions "P1" and "P2" in FIGS. 3 and 4), it is able to prevent that an engine will stall, because the motor is appropriately controlled by the pressed-down condition of the clutch pedal, for example, when a value of the pressed-down speed of the clutch is larger, then a driving of the motor is stopped.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A motor control apparatus combined with an internal combustion engine which is disposed in a vehicle, and which is connected to a transmission through a manually operated clutch and which connects to an electric motor having both driving and power-generating functions, and including a motor controller for controlling both driving and power-generating states of the electric motor in a stopping control mode and a traveling control mode based on an operating state of the vehicle and the engine, comprising: first and second clutch switches switchable ON or OFF by operating a clutch pedal for disengaging or engaging the clutch, said first clutch switch being OFF when the clutch is in a fully engaged or combined state wherein the clutch pedal is not pressed down and switching to ON when the clutch is in a partially engaged or half combined state as the clutch pedal is pressed down, and said second clutch switch being OFF when the clutch is in a fully released state wherein the clutch pedal is fully pressed down and switching to ON when the clutch is in a partially engaged or half combined state after partial return of the clutch pedal from the fully pressed down position, said motor controller, during traveling of the vehicle, stopping driving and power generation of the motor when the first clutch switch switches to ON from OFF.

2. A motor control apparatus combined with an internal combustion engine which is disposed in a vehicle and which is connected to a transmission through a manually operated clutch and which connects to an electric motor having both driving and power-generating functions, and including a motor controller for controlling both driving and power-generating states of the electric motor in a stopping control mode and a traveling control mode based on an operating state of the vehicle and the engine, comprising: first and second clutch switches switchable ON or OFF by operating a clutch pedal for disengaging or engaging the clutch, said first clutch switch being OFF when the clutch is in a fully engaged or combined state wherein the clutch pedal is not pressed down and switching to ON when the clutch is in a partially engaged or half combined state as the clutch pedal is pressed down, and said second clutch switch being OFF when the clutch is in a fully released state wherein the clutch pedal is fully pressed down and switching to ON when the clutch is in a partially engaged or half combined state after partial return of the clutch pedal from the fully pressed down position, wherein said motor controller assists in starting the engine, an assist condition in a starting drive mode of the vehicle occurring when an idle switch is OFF, vehicle speed is zero or nearly zero, and the second clutch switch becomes OFF from ON, wherein, when the assist condition occurs, the motor controller sets a flag, and at the state that the flag is set, when the second clutch switch becomes ON from OFF, the motor controller assists in starting the engine, and wherein the motor controller prevents motor driving and power generation when the second clutch switch is OFF.

3. The hybrid vehicle of claim 2, wherein a drive shaft of said internal combustion engine is aligned with or integral to an output shaft of said motor.

4. A hybrid vehicle comprising:

an internal combustion engine for powering the vehicle;

an electric motor connected to the internal combustion engine and having both driving and power-generating functions;

a manually operable clutch including a clutch pedal;

a transmission connected to the internal combustion engine and the motor through the clutch;

a first clutch switch, which is OFF when the clutch is in a fully engaged state with the clutch pedal released, and which is ON when the clutch is in a partially engaged state as the clutch pedal is pressed down and which is ON when the clutch is fully released or disengaged;

a second clutch switch which is OFF when the clutch is in a fully released state with the clutch pedal at a fully depressed position, and which is ON when the clutch is partially engaged after partial return of the clutch pedal from the fully depressed position and which is ON when the clutch is engaged;

a motor controller for controlling the electric motor in response to inputs from the first and second clutch switches, velocity of the vehicle, idle switch condition, cooling water temperature, main battery charge level, and an accelerator sensor, wherein, with the vehicle traveling, the motor controller stops driving of the electric motor when the first clutch switch switches to ON from OFF.

5. The hybrid vehicle of claim 4, wherein the motor controller sets a flag when 1) the idle switch is OFF, 2) the vehicle velocity is zero or nearly zero, and 3) the second clutch switch becomes OFF, and when the second clutch switch subsequently changes to ON with the flag set, the motor controller controls the electric motor to assist in starting of the internal combustion engine.

6. The hybrid vehicle of claim 5, wherein, for the motor controller to set the flag, the engine speed must equal zero and the first clutch switch must be ON.

7. The hybrid vehicle of claim 5, wherein, after the flag is set, the motor controller controls the electric motor to assist starting of the internal combustion engine for a predetermined time or until said first clutch switch becomes OFF.

8. The hybrid vehicle of claim 7, wherein, after the predetermined time, said motor controller stops motor driving.

9. The hybrid vehicle of claim 4, wherein a drive shaft of said internal combustion engine is aligned with or integral to an output shaft of said motor.

* * * * *